United States Patent
Fortunato (10) Patent No.: US 10,310,468 B2
(45) Date of Patent: Jun. 4, 2019

(54) METHOD FOR CONTROLLING THE ACTIVITY OF AT LEAST TWO LIGHT RADIATION SOURCES BELONGING TO A STEREOLITHOGRAPHY MACHINE

(71) Applicant: DWS S.R.L., Thiene (VI) (IT)

(72) Inventor: Roberto Fortunato, Torrebelvicino (IT)

(73) Assignee: DWS S.R.L., Thiene (IT)

( * ) Notice: Subject to any disclaimer, the term of this patent is extended or adjusted under 35 U.S.C. 154(b) by 333 days.

(21) Appl. No.: 15/329,033

(22) PCT Filed: Jul. 13, 2015

(86) PCT No.: PCT/IB2015/055288
§ 371 (c)(1),
(2) Date: Jan. 25, 2017

(87) PCT Pub. No.: WO2016/016754
PCT Pub. Date: Feb. 4, 2016

(65) Prior Publication Data
US 2017/0210078 A1    Jul. 27, 2017

(30) Foreign Application Priority Data

Jul. 30, 2014    (IT) .............................. VI2014A0199

(51) Int. Cl.
*G05B 19/042*    (2006.01)
*B33Y 50/02*    (2015.01)
(Continued)

(52) U.S. Cl.
CPC .......... *G05B 19/042* (2013.01); *B29C 64/135* (2017.08); *B29C 64/153* (2017.08);
(Continued)

(58) Field of Classification Search
CPC ...................................................... G05B 19/042
(Continued)

(56) References Cited

U.S. PATENT DOCUMENTS

| 5,985,204 A | 11/1999 | Otsuka et al. |
| 2009/0199152 A1* | 8/2009 | Sjostrom ............. G03F 7/70291 |
| | | 716/55 |

(Continued)

FOREIGN PATENT DOCUMENTS

| JP | 2000 263650 A | 9/2000 |
| WO | WO 2013/092997 A1 | 6/2013 |

OTHER PUBLICATIONS

PCT International Search Report and Written Opinion.

*Primary Examiner* — Suresh Memula
(74) *Attorney, Agent, or Firm* — Husch Blackwell LLP (57) ABSTRACT

The invention is a method for controlling the activity of two light radiation sources (2, 3) belonging to a stereolithography machine (1) and suited to act at the level of a portion (104) of a superimposition area (101) defined on the work surface (100) of the stereolithography machine (1) for the production of a three-dimensional object (200) through stereolithography. For each one of the lines (210) with generic length L that define each layer (201) of the three-dimensional object (200) within the portion (104), the method provides for activating:
a first light radiation source (2) for a first section (211) of the line (210) having length X;
a second light radiation source (3) for the remaining second section (212) of the line (210) having length Y, wherein the value X of the first section (211) is selected within the interval $0<=X<=L$ and wherein Y is calculated as equal to L−X.

8 Claims, 6 Drawing Sheets

(51) Int. Cl.
*B29C 64/135* (2017.01)
*B29C 64/153* (2017.01)
*B29C 64/386* (2017.01)

(52) U.S. Cl.
CPC ............ *B29C 64/386* (2017.08); *B33Y 50/02* (2014.12); *G05B 2219/49023* (2013.01)

(58) Field of Classification Search
USPC .......................................................... 716/54
See application file for complete search history.

(56) References Cited

U.S. PATENT DOCUMENTS

2009/0319978 A1* 12/2009 Gleason .............. G03F 7/70466
716/55
2012/0054697 A1* 3/2012 Takahata ............. G03F 7/70125
716/55

* cited by examiner

METHOD FOR CONTROLLING THE ACTIVITY OF AT LEAST TWO LIGHT RADIATION SOURCES BELONGING TO A STEREOLITHOGRAPHY MACHINE

This application claims priority from international application PCT/IB2015/055288, filed Jul. 13, 2015, which is incorporated herein by reference.

The present invention concerns a method for controlling the activity of at least two light radiation sources belonging to a stereolithography machine and suited to act at the level of a superimposition area defined on the work surface of the stereolithography machine for making a three-dimensional object through stereolithography.

The invention concerns also an apparatus and a computer program product that are configured so as to perform the steps of said method of the invention.

As is known, a stereolithography process consists in making a three-dimensional object through the sequential superimposition of a plurality of layers of the object itself.

Each layer of the object is obtained through solidification of a material in the liquid or paste state, which takes place through selective exposure to light radiation.

Typically, the material is a plastic-based compound that polymerizes when reached by said light radiation.

The solidification of each successive layer of the object is obtained through contact with the preceding solidified layer that serves as a support for the successive layer.

The process is controlled by a calculator, to which a first set of data is supplied that is representative of the three-dimensional geometry of the object to be made.

The calculator determines the geometry of the different layers of the object and consequently controls a stereolithography device.

In particular, the calculator in turn subdivides each layer into a plurality of adjacent scanning lines, which from now on are more simply referred to as "lines", at the level of which the light radiation source must be activated in order to obtain the solidification of said material. For this purpose, the lines are normally defined in such a way that their thickness is equal to the width of the light radiation beam at the level of the work surface. In other words, the width of said lines is equal to the resolution of the same beam on said work surface.

It is also known that the size of the objects that a stereolithography machine can produce depends on the size of said work surface on which the light radiation beam can act and above all on the distance between the source of said light radiation and the work surface itself.

Obviously, the longer said distance, the larger the divergence of the light radiation beam that is incident on said work surface, while the degree of resolution of the same beam at the level of said surface is consequently reduced. Therefore, the quality of the object that can be obtained with the stereolithography process is proportional to the distance between the light radiation source and the work surface of the stereolithography machine.

Therefore, in order to obtain a high degree of resolution of the object, it is necessary to reduce said distance as much as possible. However, this need limits the field of action of the light radiation beam on said work surface.

Furthermore, it is known that the light radiation beam generated by said source is typically directed onto said work surface by means of optical units.

In particular, it is well known that said optical units intrinsically contribute to further reducing the field of action of the light radiation beam on said work surface.

Therefore, as already said, this series of factors strongly limits the size of the three-dimensional objects that can be obtained using stereolithography machines provided with a single light radiation source.

Figure 1A:
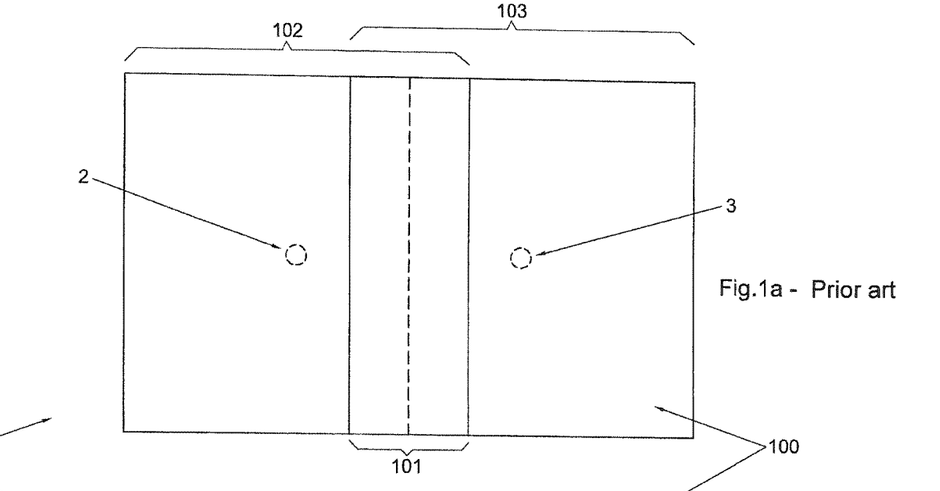
FIGS. 1a and 1b illustrating the known art respectively show schematic top and side views of the subdivision of the work surface of a stereolithography machine provided with two adjacent light radiation sources.
Figure 1B:
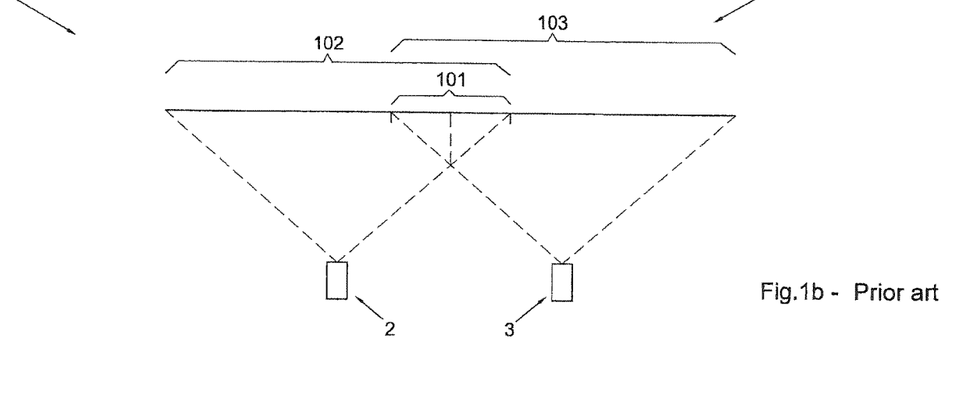

In order to overcome said limitation and thus make it possible to produce larger three-dimensional objects while at the same time maintaining a high degree of resolution of the same, a stereolithography machine 1 has been designed that is provided with at least two light radiation sources 2 and 3 adjacent to each other, each one of which is suited to act on a specific portion 102 and 103 of the common work surface 100, as schematically shown in the FIGS. 1a and 1b illustrating the known art.

As is evident from said figures illustrating the known art and as is clear to the expert in the art, said two (or more) portions 102 and 103 of the work surface 100 must be partially superimposed to each other, in such a way as to define a so-called superimposition area 101 at the level of which both of the light radiation sources 2 and 3 can act. This configuration, in fact, is indispensable in order to obtain the connection between two (or more) adjacent portions of each one of the different layers, said adjacent portions being defined, through solidification, by said adjacent light radiation sources 2 and 3.

Said connection is commonly obtained by activating both of the adjacent light radiation sources 2 and 3 at the level of the same points of the material to be solidified within said superimposition area 101.

However, to disadvantage, a first drawback posed by said approach lies in a possible undesired dilation effect, in the directions x and/or y, of the layer being produced, in the neighbourhood of said points. Said dilation effect, to disadvantage, can in turn extend at the level of the edges of the layer itself, causing the latter to be defined in a manner that is neither precise nor correct.

On the contrary, once again to disadvantage, if the two light radiation sources 2 and 3 are not correctly set, in various points of the layer they may not be able to carry out said connection, thus giving origin to a gap of not solidified material that in turn causes a weakening of the entire structure of the object being produced.

The present invention has the objective to overcome all of the drawbacks described above with reference to the method for activating two adjacent light radiation sources of the known art in order to obtain said connection.

In particular, it is one object of the present invention to define a method for activating two adjacent light radiation sources belonging to the same stereolithography machine for the production of a three-dimensional object through stereolithography, which makes it possible to obtain more homogeneity in the thickness of each layer made by means of several adjacent light radiation sources compared to the results that can be obtained with the known techniques.

Furthermore, it is another object of the invention to define a method for activating said light radiation sources which makes it possible to obtain a sturdier and more stable connection between the portions of the same layer produced by said adjacent light radiation sources.

Said objects are achieved by means of a method for controlling the action of two adjacent light radiation sources in accordance with claim 1.

Said objects are also achieved by an apparatus for controlling said adjacent light radiation sources in accordance with claim 8 and by a computer program product in accordance with claim 9.

Advantageously, the possibility to carry out the connection between the portions of a single layer defined by two adjacent light radiation sources, with no need to superimpose them, makes it possible to reduce the overall time required by the stereolithography process to make a three-dimensional object.

Said objects and advantages, together with others that will be specified here below, are highlighted in the descriptions of some preferred embodiments of the invention that are provided by way of non-limiting examples with reference to the attached drawings, wherein.

Figure 2:
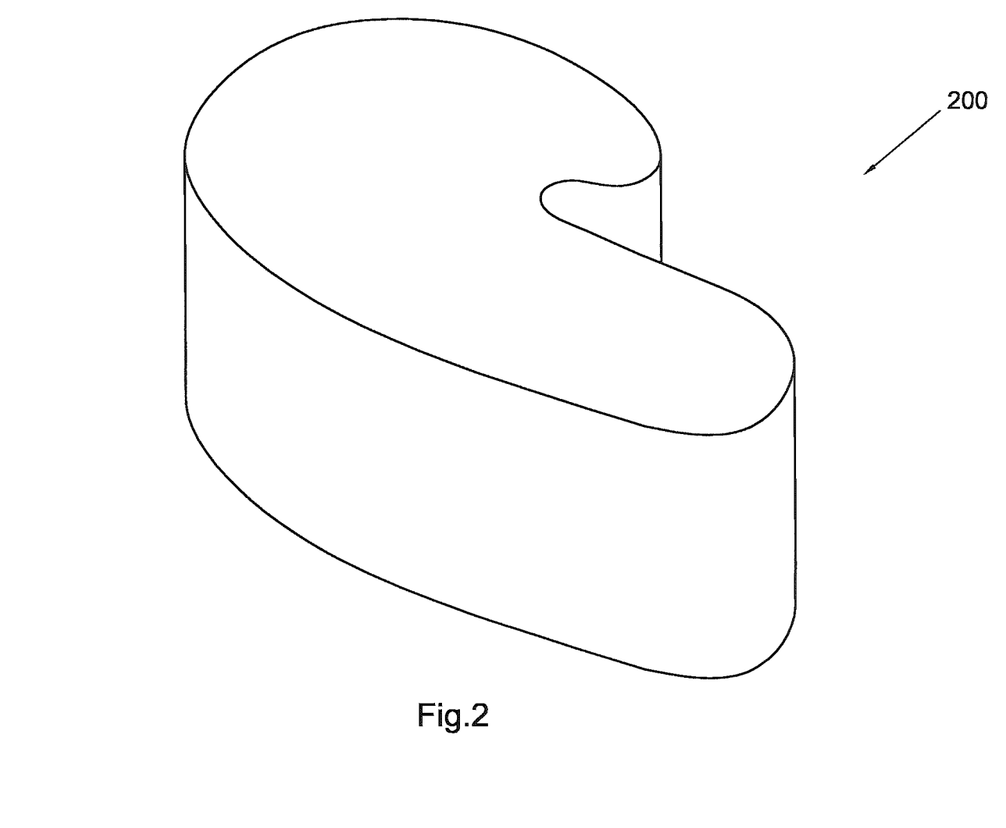
FIG. 2 shows an axonometric view of an example of a three-dimensional object to be made through stereolithography.

The method of the invention for controlling the activity of two light radiation sources 2 and 3 belonging to a stereolithography machine 1 and suited to act at the level of a superimposition area 101 defined on the work surface 100 of said stereolithography machine 1 is described with reference to the three-dimensional object shown in FIG. 2 and indicated therein by 200.

Figure 3:
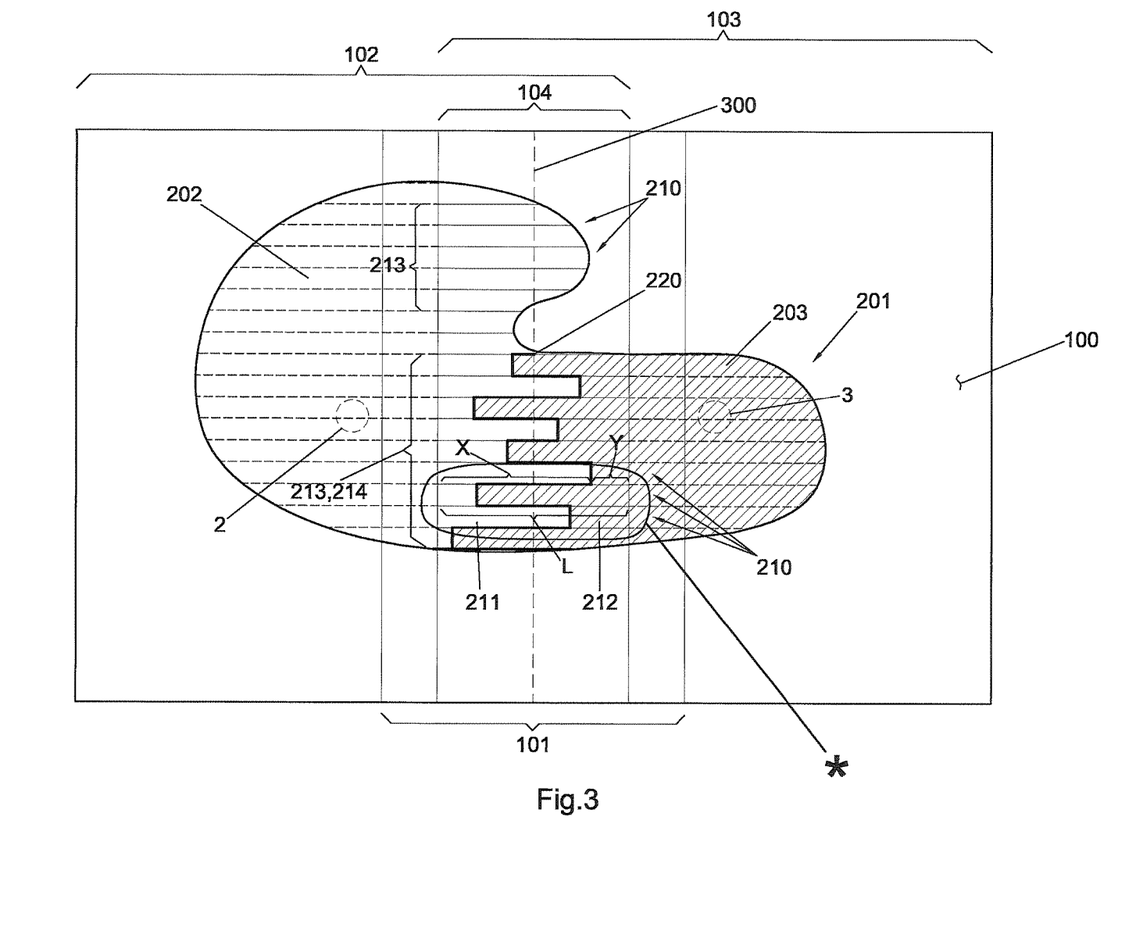
FIG. 3 shows a top view of a layer of the three-dimensional object of FIG. 2 arranged at the level of the work surface represented in FIGS. 1a and 1b to which the method of the invention is applied according to its preferred embodiment.

In particular, preferably, said method for controlling the two light radiation sources 2 and 3 is applied within said superimposition area 101 on a portion 104 with predefined width and narrower than the superimposition area 101, as shown in FIG. 3.

It cannot be excluded, however, that in alternative embodiments of the invention the width of said portion 104 may substantially coincide with the width of said superimposition area 101.

It should be underlined since now that the three-dimensional object 200 has been represented on purpose with a highly simplified geometry compared to the objects that are commonly produced through stereolithography, in order to make the drawings clearer.

However, it is evident that the process described below can be applied in an analogous manner to a three-dimensional object having any geometry.

In order to define the steps included in the method of the invention according to its preferred embodiment described herein, reference should be made to FIG. 3, which shows a top view of one of the layers 201 of the three-dimensional object 200 at the level of the work surface 100.

According to the method that is the subject of the invention, for each one of the lines 210 with generic length L that define each single layer 201 of the three-dimensional object 200 within the portion 104 of the superimposition area 101, a first source 2 is activated for a first section 211 of the line 210 with length X and the second light radiation source 3 is activated for the remaining second section 212 of the same line 210 with length Y=L−X.

In FIG. 3 the thickness of the lines 210 was increased with respect to its actual size in order to make it easier to understand the concept on which the method of the invention is based.

Figure 4:
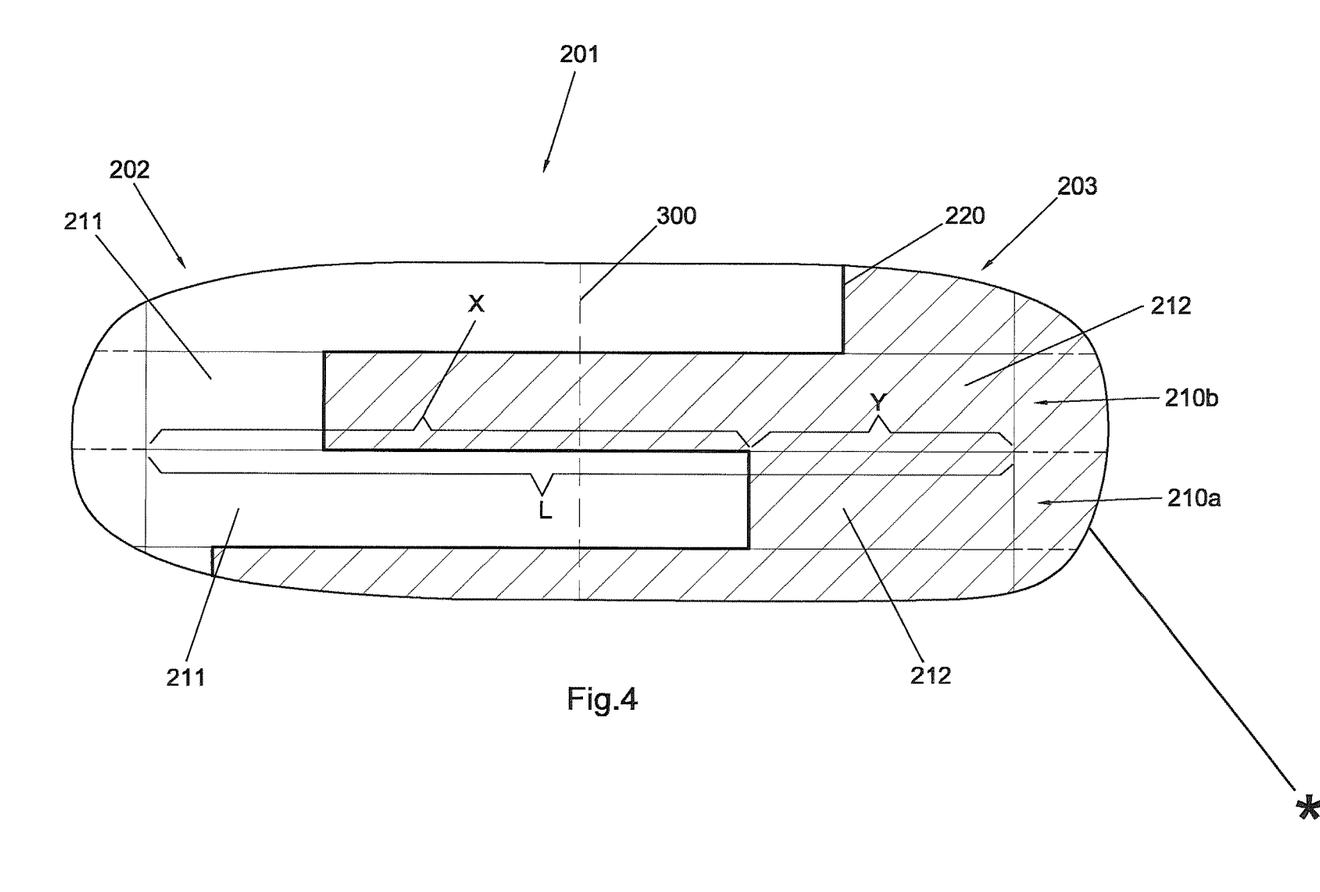
FIG. 4 shows a detail of two adjacent lines at the level of the superimposition area of the layer of FIG. 3.

Said value of the length X of the first section 211 is selected, according to the invention, within the interval $0<=X<=L$. Obviously, in order to achieve the objects indicated above, as will be clarified here below, it is important that the value of the length X differs for the various lines 210 belonging to the same layer 201, above all between adjacent lines 210, as shown in FIG. 4.

Preferably, but not necessarily, said value of the length X is selected at random for each line 210.

As can be observed in FIG. 3, said method of activation of the light radiation sources 2 and 3 makes it possible to create a connection line 220 of the broken type between the two (or more) portions 202 and 203 of each layer 201.

In particular, as can be observed always in FIG. 3, said connection line 220 creates a comb-like pattern, in which the teeth and recesses of both portions have different lengths, but are in any case defined in a perfectly complementary manner. This characteristic makes it possible to achieve the objects indicated above, and in particular it makes it possible to obtain a sturdier and more stable connection between the various portions 202 and 203 of the same layer 201 compared to the connections that are obtained with the methods of the known art.

Furthermore, said connection makes it possible to avoid the superimposition of the action of the two light radiation sources 2 and 3 in the portion 104 of the superimposition area 101, as occurs in the known art, and therefore to avoid any lack of uniformity in the thickness of each one of the layers 201, as described above.

More specifically, the method of the invention comprises the steps described below. First of all, according to the method, a first set of data representing the geometry of the three-dimensional object 200 is acquired. Successively, according to the method, said three-dimensional object 200 is subdivided into a plurality of layers 201. Furthermore, according to the method, it is necessary to define the position that each one of said layers 201 must assume at the level of said work area 100. In particular, the method establishes what part of each layer 201 must be defined exclusively by the first of said light radiation sources 2, what part exclusively by the second light radiation source 3, and, finally, what part of the layer 201 must fall within the portion 104 of the superimposition area 101, wherein the width of said portion 104, as already explained, is preferably shorter than the width of the superimposition area 101 itself.

Consequently, according to the method of the invention, for the part of each layer 201 that falls within the portion 104 of the superimposition area 101, each one of said lines 210 with generic length L is defined. Clearly, as can be understood from the example of FIG. 3, the various lines 210 can have different lengths L.

According to the method of the invention, as already mentioned, at this point the value of the length X of the first section 211 in the interval $0<=X<=L$ is defined for each one of said lines 210 with generic length L. As already explained, said value is preferably selected at random within said interval.

According to the invention, the length Y of the second section 212 is successively calculated for each line 210 with generic length L, so that it is Y=L−X.

Finally, the method of the invention includes the step of generating the data concerning the activation of the two light radiation sources 2 and 3 in such a way that a first one of them is activated along said first section 211 of each one of the lines 210, while the second one of said two light radiation sources 2 and 3 is activated along the remaining second section 212.

According to the preferred embodiment of the method of the invention, before the generation of said data for the activation of the two light radiation sources 2 and 3, also an intermediate line 300 of the portion 104 of the superimposition area 101 is defined, which, as can be observed in FIG. 3, is substantially orthogonal to said lines 210 of the part of the layer 201 within the same portion 104.

Said intermediate line 300 makes it possible to select, among all the lines 210 with generic length L, exclusively the subset 213 of the same lines 210 that are incident on said intermediate line 300.

Furthermore, always according to the preferred embodiment of the invention, the method furthermore includes the step of selecting, within said subset 213 of incident lines, only the subset 214 of lines 210 that extend over the entire width of the portion 104 of the superimposition area 101. Only at the end of said selection, according to the method, the two light radiation sources 2 and 3 are activated in the manner described above, exclusively at the level of the lines 210 belonging to the latter subset 214. Regarding the remaining lines 210 that are present in the portion 104 and excluded from said selection, according to the method of the invention for their definition exclusively one or the other of the two light radiation sources 2 and 3 is activated. In particular, preferably, the choice of which one of the two light radiation sources 2 and 3 must be used to define each one of these excluded lines 210 depends on the position in which the line 210 in question falls with respect to said intermediate line 300.

In the example illustrated in FIG. 3, for the definition of said excluded lines 210 the light radiation source 2 arranged on the left will be conveniently selected.

Figure 5:
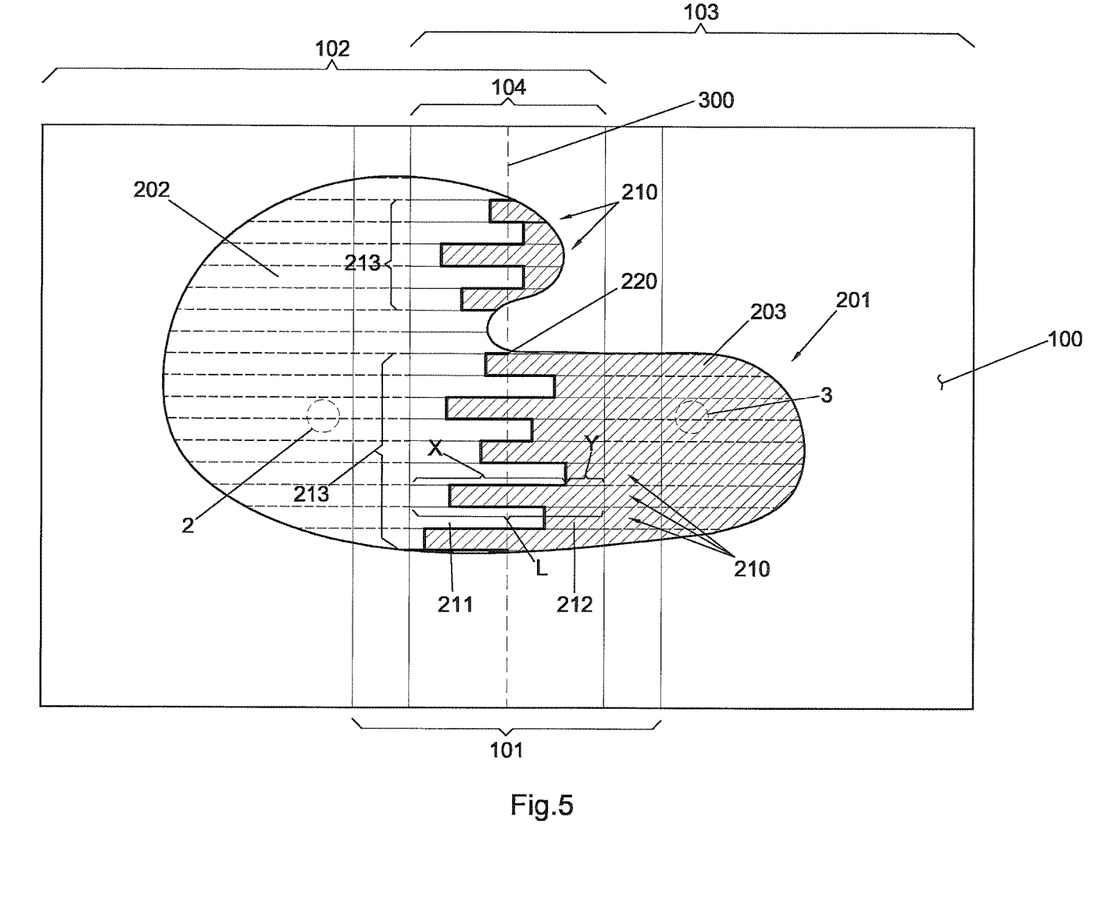
FIG. 5 shows a top view of a layer of the three-dimensional object of FIG. 2 arranged at the level of the work surface shown in FIGS. 1a and 1b to which the method of the invention is applied according to a first alternative embodiment.

In a different embodiment of the invention illustrated in FIG. 5, it cannot be excluded, however, that according to the method both of the light radiation sources 2 and 3 are activated, in the manner just described above, for all of the lines 210 belonging to the subset 213 of incident lines, without the further selection of the lines 210 that extend over the entire width of the portion 104.

In this case, the lines 210 excluded from said subset 213 of incident lines will be those to be defined through the activation of only one of the light radiation sources 2 and 3. Also in this case, the choice of the one or the other source 2 and 3 to be activated is preferably made according to the position of each one of said excluded lines with respect to said intermediate line.

Figure 6:
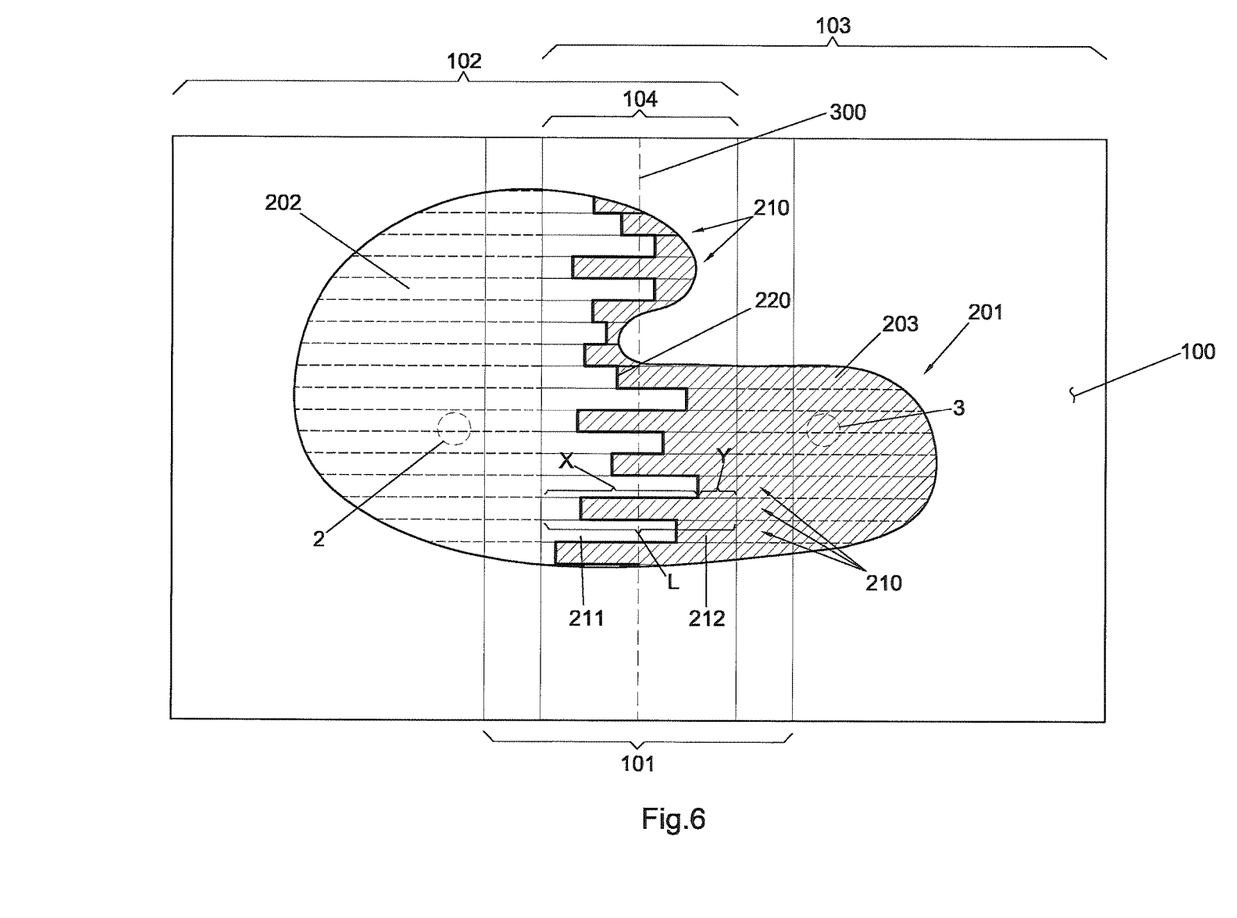
FIG. 6 shows a top view of a layer of the three-dimensional object of FIG. 2 arranged at the level of the work surface shown in FIGS. 1a and 1b to which the method of the invention is applied according to a second alternative embodiment.

Moreover, according to a further alternative embodiment of the method of the invention represented in FIG. 6, both of said light radiation sources 2 and 3 may be activated, in the manner described above, for all of the lines 210 of each one of the layers 201 that fall within the portion 104 of the superimposition area 101, without performing any of the further selections described above.

Going back to the preferred embodiment of the invention, as can be observed in the detailed view shown in FIG. 4, according to the method, for each pair of adjacent lines 210a and 210b belonging to the subset 214 of lines extending over the entire width of the portion 104, the values corresponding to the lengths X of the first sections 211 of said two lines 210a and 210b are selected in such a way that the first section 211 of the first line 210a, along which the first light radiation source 2 is suited to act, and the second section 212 of the second line 210b, along which the second light radiation source 3 is suited to act, are incident on the intermediate line 300. This further detail of the method that is the subject of the invention makes it possible to guarantee perfect alternation between the action of the first light radiation source 2 and of the second light radiation source 3 astride the intermediate line 300 for adjacent lines 210a and 210b. Consequently, said characteristic makes it possible to further improve the result of the connection between the two portions of the same layer 201 obtained through said light radiation sources 2 and 3.

In a different embodiment of the invention, however, it cannot be excluded that according to the method the value of the length X be selected exclusively at random, without guaranteeing also the alternation of the action of the two light radiation sources 2 and 3 astride said intermediate line 300.

For the sake of simplicity, the steps of the method that is the subject of the invention up to now have been described with reference to a stereolithography machine 1 comprising two light radiation sources 2 and 3. It cannot be excluded, however, that the same method of the invention may be used to control the activation of more than two light radiation sources, adjacent in pairs and belonging to the same stereolithography machine 1.

Obviously, said method must be used to activate each pair of adjacent light radiation sources in a controlled manner.

Preferably, the method described above is implemented by means of an apparatus comprising a calculator, not represented in the figures but known per se, provided with a processing unit and a memory support that can be accessed by said processing unit.

Said apparatus comprises means suited to acquire a first set of data representative of the geometry of the three-dimensional object 200 and to upload it into said memory support.

The apparatus comprises also means suited to subdivide the three-dimensional object 200 into a plurality of layers 201.

The apparatus comprises also means suited to define the position of each one of said layers 201 on said work surface 100.

The apparatus furthermore comprises means suited to identify, within the portion 104 of the superimposition area 101 belonging to said work surface 100, each one of the lines 210 with generic length L that define each one of the different layers 201.

According to the invention, said apparatus comprises means suited to define, for each one of the lines 210 with generic length L, the value of the length X of a first section 211 of said line 210 within the interval $0 <= X <= L$.

Said choice of the value of the length X is preferably made at random.

Furthermore, the apparatus according to the invention comprises means for calculating, for each one of the lines 210 with generic length L, the length Y of the second section 212 of said line 210, equal to $Y = L - X$. Finally, the apparatus of the invention comprises means for generating data related to the activation of at least two light radiation sources 2 and 3 belonging to a stereolithography machine 1, in such a way that a first one of said two light radiation sources 2 and 3 is activated along the first section 211 of each one of the lines 210, while the second one of the two light radiation sources 2 and 3 is activated along the remaining second section 212 of the same line 210.

Preferably, said apparatus is configured by means of a computer program product comprising a data support provided with program portions configured in such a way that when they are executed on said calculator they define the means of the apparatus as described above.

According to the above, it can be understood that the method, the apparatus and the computer program product previously described achieve all the set objects.

In particular, the invention achieves the object to provide a method for activating at least two adjacent light radiation sources belonging to the same stereolithography machine for the production of a three-dimensional object through stereolithography, wherein said method makes it possible to obtain more homogeneity in the thickness of each layer obtained by means of several light radiation sources compared to the results obtainable with the known techniques.

The invention also achieves the object to provide a method for activating said adjacent light radiation sources that makes it possible to obtain a sturdier and more stable connection between the portions of the same layer obtained by means of said light radiation sources.

The invention claimed is:

1. A method for controlling the activity of at least two light radiation sources (2, 3) of a stereolithography machine (1) and suited to act at the level of a portion (104) of a superimposition area (101) defined on a work surface (100) of said stereolithography machine (1) for making a three-dimensional object (200) through stereolithography, said method providing to activate the following elements for each one of a plurality of lines (210) with generic length L that define each layer (201) of said three-dimensional object (200) within said portion (104):
   a first one of said two light radiation sources (2) for a first section (211) of said line (210) with length X;
   the second one of said two light radiation sources (3) for the remaining second section (212) of said line (210) with length Y,
the value of said length X of said first section (211) being selected within an interval 0<=X<=L and Y being calculated as equal to L−X;
characterized in that said value of said length X of said first section (211) for each one of said lines (210) is selected at random within the interval 0<=X<=L in such a way to create a connection line (220) of the broken type between two portions (202) and (203) of each layer (201) defined respectively by said first sections (211) of said lines (210) and by said second sections (212) of said lines (210).

2. The method according to claim 1, of the type comprising the following steps:
   acquiring a first set of data representative of the geometry of said three-dimensional object (200);
   subdividing said three-dimensional object (200) into a plurality of layers (201);
   defining the position of each one of said layers (201) on said work surface (100);
   identifying, within said portion (104) of said superimposition area (101), each one of said lines (210) with generic length L that define each one of said layers (201);
characterized in that the method further comprises the steps of:
   defining, for each one of said lines (210) with generic length L, said value of said length X of said first section (211) within the interval 0<=X<=L;
   calculating, for each one of said lines (210) with generic length L, the length of said second section (212) equal to Y=L−X; and
   generating the data relating to said activation of said two light radiation sources (2, 3) so that a first one of said two light radiation sources (2) is activated along said first section (211) of each one of said lines (210) and the second one of said two light radiation sources (3) is activated along said remaining second section (212).

3. The method according to claim 1, characterized in that the method includes the following steps before said activation of said two light radiation sources (2, 3):
   defining an intermediate line (300) of said portion (104) of said superimposition area (101) substantially in an orthogonal direction with respect to said lines (210); and
   selecting, among all said lines (210) with generic length L, exclusively a subset (213) containing those of said lines (210) that are incident on said intermediate line (300).

4. The method according to claim 3, characterized in that the method activates exclusively one of said two light radiation sources (2, 3) at the level of the lines (210) not belonging to said subset (213) of incident lines.

5. The method according to claim 3, characterized in that the method includes the following steps before said activation of said two light radiation sources (2, 3):
   selecting, in said subset (213) of incident lines, exclusively the subset (214) of lines (210) that extend over the entire width of said portion (104) of said superimposition area (101).

6. The method according to claim 5, characterized in that the method activates exclusively one of said two light radiation sources (2, 3) at the level of the lines (210) not belonging to said subset (214) of lines extending over the entire width of said portion (104) of said superimposition area (101).

7. An apparatus for controlling the activity of two light radiation sources (2, 3) of a stereolithography machine (1) and suited to act at the level of a portion (104) of a superimposition area (101) defined on the work surface (100) of said stereolithography machine (1) for making a three-dimensional object (200) through stereolithography, of the type comprising:
   a calculator comprising a processing unit and a memory support suited to be accessed by said processing unit;
   means suited to acquire a first set of data representative of the geometry of said three-dimensional object (200) and to upload the first set of data into said memory support;
   means suited to subdivide said three-dimensional object (200) into a plurality of layers (201);
   means suited to define the position of each one of said layers (201) on said work surface (100);
   means suited to identify, within said portion (104) of said superimposition area (101), each one of a plurality of lines (210) with generic length L defining each one of said layers (201);
   means suited to define, for each one of said lines (210) with generic length L, said value of said length X of said first section (211) within the interval 0<=X<=L;
   means suited to calculate, for each one of said lines (210) with generic length L, the length of said second section (212);
   means suited to generate the data relating to said activation of said two light radiation sources (2, 3) in such a way that a first one of said two light radiation sources (2) is activated along said first section (211) of each one of said lines (210), and the second one of said two light radiation sources (3) is activated along said remaining second section (212);

characterized in that said means suited to define said value of said length X of said first section (211) are means for the generation of random numbers within an interval $0<=X<=L$.

8. A computer program product comprising a data support provided with program portions configured in such a way that, when executed on a calculator comprising a processing unit and a memory support accessible by said processing unit, said program portions define:

- a calculator comprising a processing unit and a memory support accessible by said processing unit;
- means suited to acquire a first set of data representative of the geometry of said three-dimensional object (200) and to upload it into said memory support;
- means suited to subdivide said three-dimensional object (200) into a plurality of layers (201);
- means suited to define a position of each one of said layers (201) on said work surface (100);
- means suited to identify, within a portion (104) of a superimposition area (101), each one of a plurality of lines (210) with generic length L defining each one of said layers (201);
- means suited to define, for each one of said lines (210) with generic length L, a value of length X of a first section (211) within an interval $0<=X<=L$;
- means suited to calculate, for each one of said lines (210) with generic length L, a length of a second section (212);
- means suited to generate data relating to activation of two light radiation sources (2, 3) in such a way that a first one of said two light radiation sources (2) is activated along said first section (211) of each one of said lines (210), and the second one of said two light radiation sources (3) is activated along said remaining second section (212);

characterized in that said means suited to define said value of said length X of said first section (211) are means suited to generate random numbers within the interval $0<=X<=L$.

* * * * *